Oct. 6, 1964 R. S. WEIL 3,151,471
AIR CONDITIONING SYSTEM FOR ELECTRONIC
INSTRUMENT CABINETS
Filed July 16, 1962

INVENTOR
ROBERT S. WEIL
BY
ATTORNEY

United States Patent Office 3,151,471
Patented Oct. 6, 1964

3,151,471
AIR CONDITIONING SYSTEM FOR ELECTRONIC INSTRUMENT CABINETS
Robert S. Weil, Santa Monica, Calif., assignor to W.D. Industries, Ltd., Beverly Hills, Calif., a corporation of California
Filed July 16, 1962, Ser. No. 209,905
2 Claims. (Cl. 62—332)

This invention relates to an air conditioning system for electronic instrument cabinets.

Complex installations of electronic equipment such as computers and the like enclosed in cabinets frequently become overheated when in use. Because of the large sizes of some of these units or cabinets, the air conditioning systems designed for personnel comfort in the buildings or rooms in which the cabinets are used are insufficient to handle the extra heat load developed in the electrical and electronic equipment and therefore auxiliary air conditioning including cooling capacity is essential. Further, a high humidity in the atmosphere is detrimental to the proper functioning of some equipment, especially if it causes condensation of moisture on exposed parts of the equipment, and therefore the problem involves both temperature control, and humidity control to the extent that there is no possibility of moisture condensing inside the cabinet, or too high or too low humidity environment interfering with the proper functioning of magnetic tapes, or electronic and solid state components.

The principal object of this invention is to provide an auxiliary air conditioning system for cabinets containing electronic equipment. Another object is to provide means for dehumidifying, cooling, and circulating air through electrical and electronic cabinets. Another object is to provide means for mixing cooled and dehumidified fresh air expanded from a compressed air system with ambient room air to maintain the proper cooling of electronic equipment cabinets. Still another object is to provide means for dehumidifying and cooling the air circulated through electrical and electronic equipment cabinets by using expanded humidity controlled compressed fresh air as the cooling medium.

These and other objects are attained by my invention, which will be understood from the following description, reference being made to the accompanying drawings in which FIG. 1 is a side elevational view partly schematic, partly in section and with certain parts broken away showing a preferred form of my invention as applied to an electronic equipment cabinet within a building or room and using air treating equipment remote from said room;

Figure 1:
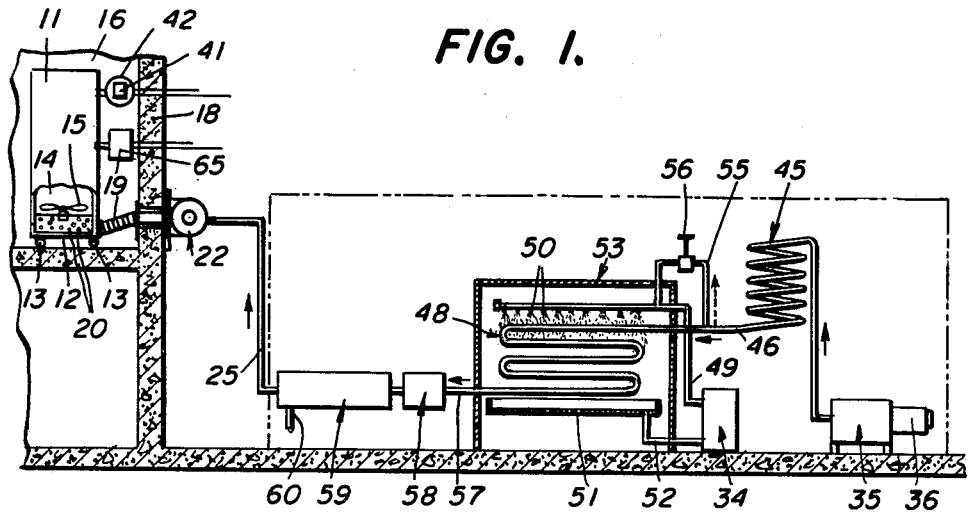
Figure 2:
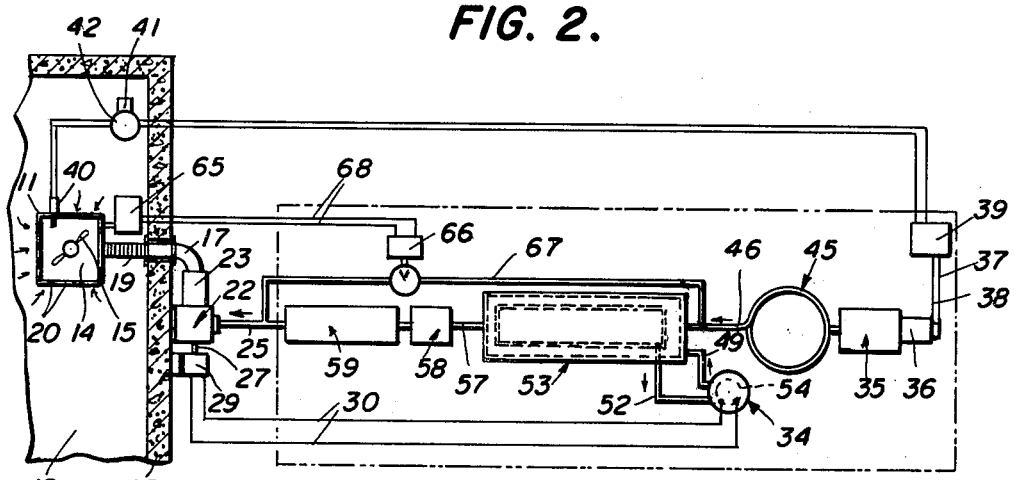
FIG. 2 is a plan view of the same.
Figure 3:
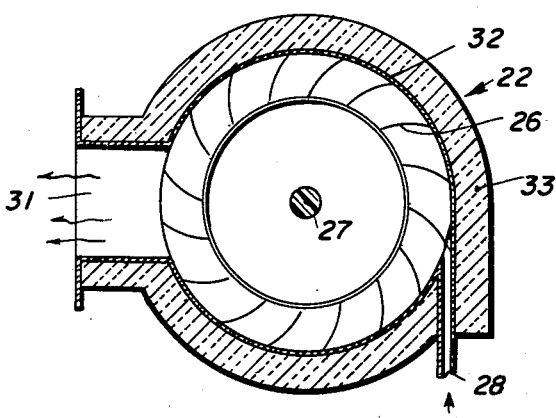
FIG. 3 is a cross-sectional view of the air expander.

In general, my new system comprises a motor driven air compressor, compressing air in the range from about 2 to 4 atmospheres, an air cooled cooling coil, a refrigerated water-spray cooled coil in which excess moisture is condensed out, a trap to remove liquid water from the compressed air, a turbine type air expander which is thermally insulated and mechanically loaded (such as by driving an electric generator) to produce conditions for adiabatic expansion (and resultant cooling) of the air, and a fan which mixes the expanded humidity controlled cold air with induced ambient air around the cabinet, and forces it through the electronic cabinet.

Referring to the drawings, an electronic equipment cabinet 11 is mounted on a platform 12 which may be provided with means such as casters 13 to elevate the platform above the floor sufficiently to permit the intake of air from the room through inlet holes into the air mixing chamber 14. The air mixing chamber has mounted therein an electrically driven fan 15 which delivers a mixed stream of cooled and partly dehumidified air upwardly through the enclosed instruments.

The cabinet 11 is conveniently connected to a cooled air pipeline 17 entering through the wall 18 of the room 16 by a flexible duct 19 which permits a limited amount of movement of the whole cabinet. The air entering through this flexible duct 19 and the pipeline 17 is provided by the air expander 22 which is conveniently mounted on the wall 18 outside the room in which the electronic equipment is operated. The air expander 22 is provided at its outlet with a noise filter 23 of a commonly used muffler type. A compressed air line 25 delivers compressed air to the air expander 22 from a compressor and dehumidifier system which will be described below, which system is conveniently located in an isolated space such as the basement or a separate room. The shaft 27 of the air expander 22 is operatively connected to an electric generator 29 which may also be mounted on the wall 18. The electrical generator is provided with electric leads 30 which deliver the generated electrical current to operate a small refrigeration unit 34 (for example such as a General Electric standard water cooler), of suitable capacity.

The compressor and dehumidifying unit which provides cooled and dehumidified compressed air consists of an axial flow compressor 35 driven by an electric motor 36 which is electrically connected to power leads 37 and 38 through a control switch 39 which is actuated by a temperature sensing means 40 located in the cabinet 11, and having an indicator 41 and switch control means 42. An air cooled coil 45 is connected to the air output pipe of the axial flow compressor 35 and is arranged in an open pattern so that ambinet air flows by convection over the coils and cools the heated compressed air from the compressor to the ambient air temperature. The outlet end 46 of the coil 45 is operatively connected to another set of coils 48 which are water cooled and are arranged in vertical return loops so that overhead water spray nozzles 50 deliver cooled water to the outside surfaces of the coils 48, the water being collected below in the pan 51, and drained back to the refrigeration water cooler 34 by the pipe 52. The water cooled coils are conveniently enclosed in a housing 53 to contain the spray and vapor which may result from this operation. The refrigeration water cooler 34 is driven by a motor 54 to circulate water and effect its refrigeration by a conventional refrigeration water cooler.

A bypass pipeline 55 is connected to the air cooled output pipe 46 and to the cooled water pipe 49 ahead of the nozzles 50, there being a shutoff valve 56 in this bypass line. The purpose of this bypass line for the admission of air into the cooled water line is to provide turbulence for more efficient cooling by the sprayed water.

The cooled compressed air from the water-cooled coils 48 is delivered by the spray cooler outlet pipe 57 to a fine mesh screen water trap 58 and a water separator 59 which together separate the condensed liquid water and remove it by the drain pipe 60. The dehumidified and cooled compressed air is then delivered by the pipe 25 to the air expander 22, as previously described.

The power line leads 37 and 38 for the motor 36 for the axial compressor 35 are placed in an operative circuit with a power control switch 39 actuated electrically from the thermostat switch 42 of the thermostat 41 which is placed adjacent the cabinet 11 and sensing the temperature inside the cabinet by a thermometer 40. When air cooler than the room ambient air is needed in the cabinet, the thermostat switch 42 actuates the control switch 39 and starts the compressor and dehumidifying parts of the system.

A sensing humidistat or humidity controller 65 in and adjacent the cabinet 11 may be employed to control the humidity of the delivered air, by means of a motorized flow valve 66 in a bypass air line 67 connected to the output pipe 46 and to the compressed air line 25 going to the air expander 22, the flow valve 66 being controlled by an electric control circuit 68 connected to the humidity controller 65.

The several elements of the air conditioning system are selected as to capacity to meet the requirements of the particular installation. Summer relative humidity of 65 to 90 percent is generally prevalent, and it is essential for satisfactory performance of the electronic instruments that no moisture condenses on the equipment because of the air cooling, nor that the air be so humid as to interfere with the satisfactory performance of the electronic and other components.

In one illustrative installation, 100 c.f.m. of air at two atmospheres from the compressor was at 200° F. temperature and 60 percent relative humidity. It was cooled to about 95° F. by passing it through a 70 foot length of air cooled coils 45. The compressed air was then cooled to 55 to 60° F. by the water cooled coils 48, cooled by water from the water cooler 33. Condensed water was removed through the drain pipe 60, and the thus dehumidified compressed air at 55 to 60° F. and 30 percent relative humidity was passed into the expander 22 and further cooled before being mixed with the induced room air through the air inlets 20.

In another illustrative example, a typical computer bank would consist of five electronic cabinets placed against a wall of the computer room, each drawing about 0.75 kw. of power, and requiring 150 c.f.m. of cooling air to provide an outlet temperature of 75° F. from the cabinet at 50 percent relative humidity. Of this quantity, 110 c.f.m. would be recirculated from the computer room, and 40 c.f.m. would be cooled air from the expander at 40° F. and 30 percent relative humidity. The expander would have a capacity of 200 c.f.m., and feed 40 c.f.m. to each of the five cabinets, through flexible hose connections.

The air expander 22 consists of a turbine type rotor 26 mounted on a shaft 27 and having an inlet nozzle 28 and an outlet 31. The rotor revolves in the housing 32 which is provided with an efficient heat insulating covering 33 such as glass wool or bonded magnesia insulation, which prevents the pickup of heat from the air surrounding the expander. The expander is preferably made of non-metallic parts to also prevent pickup of heat, and this is particularly true of the shaft 27 which is preferably made of a non-metallic, low heat conductive material such as "Formica" of similar reinforced synthetic plastic products.

The objectives stated in the beginning are attained by the invention described.

I claim:

1. In an air conditioning system for an enclosure, which includes a mixing chamber wherein ambient air may be mixed with cooled humidity controlled air free from liquid water at atmospheric pressure delivered to said mixing chamber from a remote means; means for supplying said cooled humidity controlled air free from liquid water at atmospheric pressure including a motor driven axial air compressor to compress ambient air from about two to four atmospheres pressure; means to cool said compressed air below ambient temperature; trap means for removing condensed water from said cooled compressed air whereby to at least partly dehumidify it; a heat-insulated turbine air-expander whose casing, shaft, and rotor are made of non-metallic material having low heat conductivity and low heat capacitance, adapted to adiabatically expand compressed and partly dehumidified air supplied thereto; and loading means operatively connected to said air-expander.

2. An air conditioning system for electronic and electrical equipment comprising a cabinet enclosing said equipment and having openings for circulating air through said cabinet and around said equipment; a mixing chamber disposed within said cabinet communicating with said openings and having inlet vents communicating with the ambient air in the room containing said cabinet, and also having duct means for the entry of cooled humidity controlled air at atmospheric pressure into said mixing chamber; remote means for supplying said cooled humidity controlled air free from liquid water at atmospheric pressure to said conduit; said remote means including a motor driven axial air compressor to compress ambient air from about two to four atmospheres pressure; air cooling coils arranged to cool said compressed air to about ambient temperature; water cooled coils to cool said compressed air below ambient temperature; trap means for removing condensed water from said cooled compressed air whereby to at least partly dehumidify it; electrically operated means to refrigerate water for said water cooling coils; a heat-insulated turbine air-expander whose casing, shaft, and rotor are made of non-metallic material having low heat conductivity and low heat capacitance, adapted to adiabatically expand compressed and partly dehumidified air supplied thereto; and electric generator means operatively connected to said air-expander to generate electrical energy for refrigeration of the cooling water for use in said water cooling coil means.

References Cited in the file of this patent

UNITED STATES PATENTS

| | | |
|---|---|---|
| 2,069,269 | Perkins | Feb. 2, 1937 |
| 2,304,151 | Crawford | Dec. 8, 1942 |
| 2,734,443 | Wood | Feb. 14, 1956 |
| 2,800,002 | Seed | July 23, 1957 |
| 2,850,242 | Newton | Sept. 2, 1958 |
| 2,928,261 | Sampietro | Mar. 15, 1960 |
| 2,975,609 | Allander | Mar. 21, 1961 |

OTHER REFERENCES

Ser. No. 353,551, Schutte (A.P.C.), published May 25, 1943.